United States Patent [19]

Swallow

[11] 4,130,478
[45] Dec. 19, 1978

[54] BOWL SHAPED SCREENING APPARATUS

[75] Inventor: Douglas M. Swallow, Toronto, Canada

[73] Assignee: Sweco, Inc., Los Angeles, Calif.

[21] Appl. No.: 827,461

[22] Filed: Aug. 25, 1977

[51] Int. Cl.² .............................................. B07B 1/06
[52] U.S. Cl. .................................... 209/254; 209/380; 209/389
[58] Field of Search ............... 209/240, 254, 268, 270, 209/273, 305, 306, 380, 393, 395, 385, 389, 300, 303, 304, 243; 210/354

[56] References Cited

U.S. PATENT DOCUMENTS

| | | | |
|---|---|---|---|
| 1,669,029 | 5/1928 | Watjner | 209/273 |
| 1,675,612 | 7/1928 | Laird | 209/270 |
| 2,367,961 | 1/1945 | Piponius | 209/270 |
| 2,857,053 | 10/1958 | Schmiedel | 209/270 |
| 3,081,873 | 3/1963 | Cowan et al. | 209/273 |
| 3,501,002 | 3/1970 | Talley | 209/240 |
| 3,511,374 | 5/1970 | Beal | 209/273 |

FOREIGN PATENT DOCUMENTS 678037  1/1964  Canada .................... 209/274

Primary Examiner—Robert Halper
Assistant Examiner—Jon Hokanson
Attorney, Agent, or Firm—Lyon & Lyon

[57] ABSTRACT

An apparatus having a bowl-shaped screen with a large opening at the upper end thereof and a smaller opening at the lower end thereof for screening annularly distributed influent. An influent manifold is located above the screen to distribute influent downwardly into the upper opening. An effluent receiver is positioned about the screen while a concentrate receiver is positioned below the lower opening of the screen. A distributor cone is positioned in the upper opening to direct influent outwardly and downwardly to the screen. The cone is vertically adjustable to vary the size of the annular opening between the cone and the screen. The cone is also rotatably mounted to aid in uniformity of distribution. A tangential influent feed is employed to induce rotation of the distribution cone. A rotatably mounted backspray manifold extends about the screen with nozzles directed to induce rotation of the manifold. A wiper blade extending to the lower opening of the screen is attached to the backspray manifold for inducing concentrate into the concentrate receiver.

3 Claims, 4 Drawing Figures

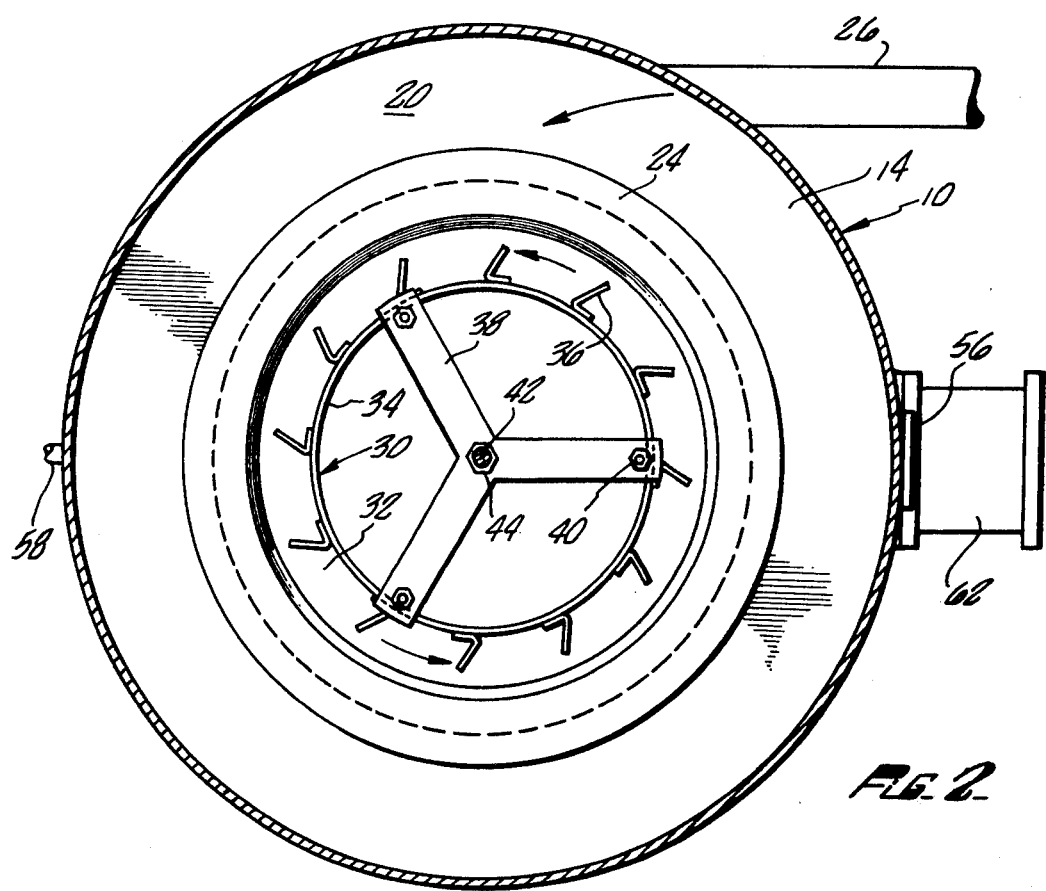
FIG. 2
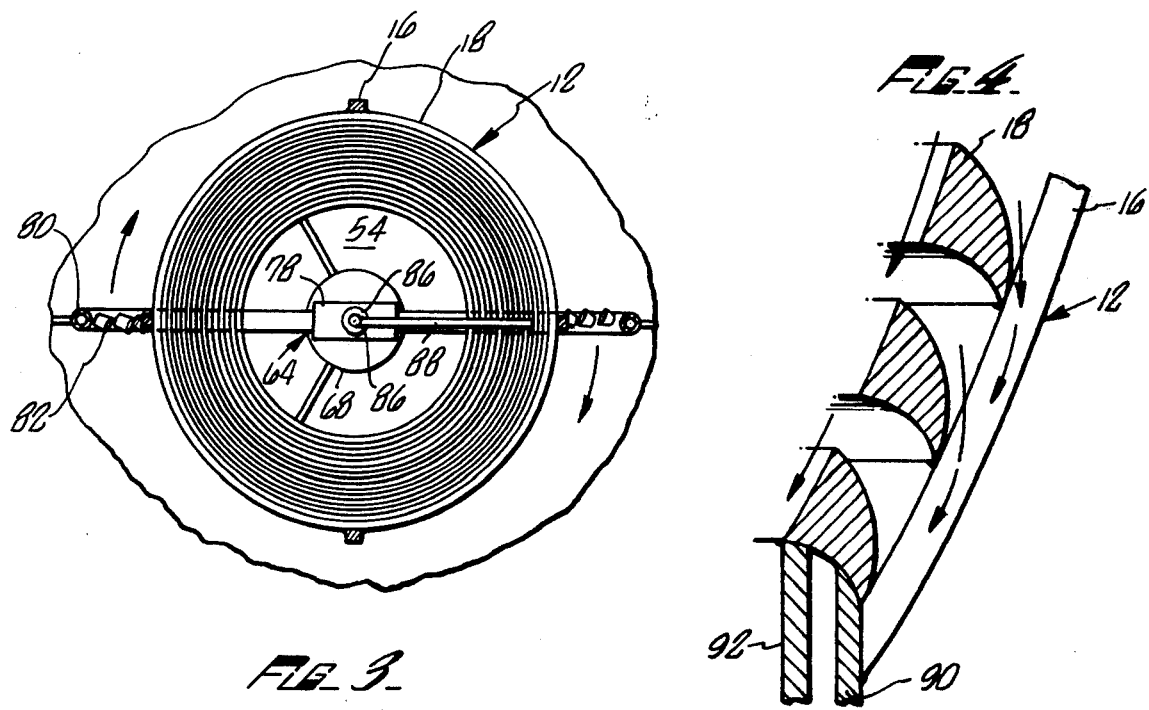
FIG. 3
FIG. 4

BOWL SHAPED SCREENING APPARATUS

BACKGROUND OF THE INVENTION

The present invention is directed to an improved screening apparatus. More specifically, the present invention is directed to a bowl-shaped static screen having improved annular distribution of influent thereto and a system assuring solids removal from the screen.

A variety of inclined, static screens have been used for the separation of solids-containing liquids. One such screen system is disclosed in U.S. Pat. Nos. 2,872,041, and 2,916,142. Similar screening systems employing a conical arrangement have also been used; see U.S. Pat. No. Des. 226,398. The latter, conical or bowl-shaped arrangement is believed to be more efficient from a space-saving standpoint and is less subject to damage because of its inherently closed nature. Another advantage of the bowl-shaped static screen is the inherent decrease in the width of the screen toward the outlet. The highest rate of flow is experienced at the upper or influent end of the screen. As the influent moves downwardly along the screen, the flow is greatly reduced as liquid passes through the screen to the effluent receiver. As the flow decreases, less screen width is necessary. It is further believed that in some instances, this natural reduction in width of the screen may be advantageous to the promotion of continued flow in the lower portion of the screen.

For both straight and bowl-shaped static screens, controlled distribution of influent is advantageous to assure maximum utilization of the screen area. It is also of benefit for maximum screen efficiency, screen life and uniformity of separation that distribution of influent be as uniform as possible to all portions of the screen. Furthermore, varying flow rates and influent properties require variations in the distributor geometry to gain maximum efficiency. These requirements have been more easily solved through the use of screens having straight, rather than curved, horizontal elements. Screens having straight horizontal elements employ straight inlet orifices which are more easily balanced and adjusted to obtain proper and uniform flow to the screen.

Another difficulty encountered with static screens is the collection of solids near the outlet thereof. It has been common practice to allow the solids collecting at the lower end of the screen to build up until the material naturally moves to the concentrate receiver. In some instances, this build-up may result in a loss of separating efficiency. Of course, hand scraping of a screen is possible; however, such practice is generally objectionable because of the labor involved and the dependence on timely attention thereto.

SUMMARY OF THE INVENTION

The present invention is directed to a bowl-shaped screening apparatus having improved influent distribution thereto and solids removal therefrom. A mechanism is provided for annularly distributing influent to the upper end of a bowl-shaped, static screen which is adjustable to allow variation of the annular orifice to accommodate influents of varying properties. Uniform distribution of influent to all portions of the screens is also accomplished by the present invention.

To accomplish the foregoing, a distributor cone is provided which extends to near the bowl-shaped screen to define an annular inlet orifice. The distributor is vertically adjustable to obtain variation in the size of the annular orifice. The distributor is also rotatably mounted relative to the screen to insure uniform distribution thereto. A tengential feed also aids uniform distribution.

A cleaning assembly is also provided to insure continued maximum use of the screen. A rotatably mounted backspray manifold extends about the bowl-shaped screen to promote dislodging of accumulated solids therefrom. Backspray nozzles are arranged on the manifold such that the manifold is urged to rotate and thereby cover the entire screen. A wiper is associated with the rotatably backspray manifold such that a simple mechanism is provided for automatically removing accumulated solids from the lower end of the screen. By means of this rotatable assembly, manual screen care is largely obviated.

Accordingly, it is an object of the present invention to provide a bowl-shaped screening apparatus having improved influent distribution.

It is another object of the present invention to provide a bowl-shaped screening apparatus having improved means for removing solids from the screen.

Other and further objects and advantages will become apparent hereinafter.

BRIEF DESCRIPTION OF THE DRAWINGS

FIG. 2 is a cross-sectional plan view taken along line 2—2 of FIG. 1.

FIG. 3 is a cross-sectional plan view taken along line 3—3 of FIG. 1.

FIG. 4 is a detailed cross-sectional elevation showing elements of the screen.

DETAILED DESCRIPTION OF THE PREFERRED EMBODIMENT

Figure 1:
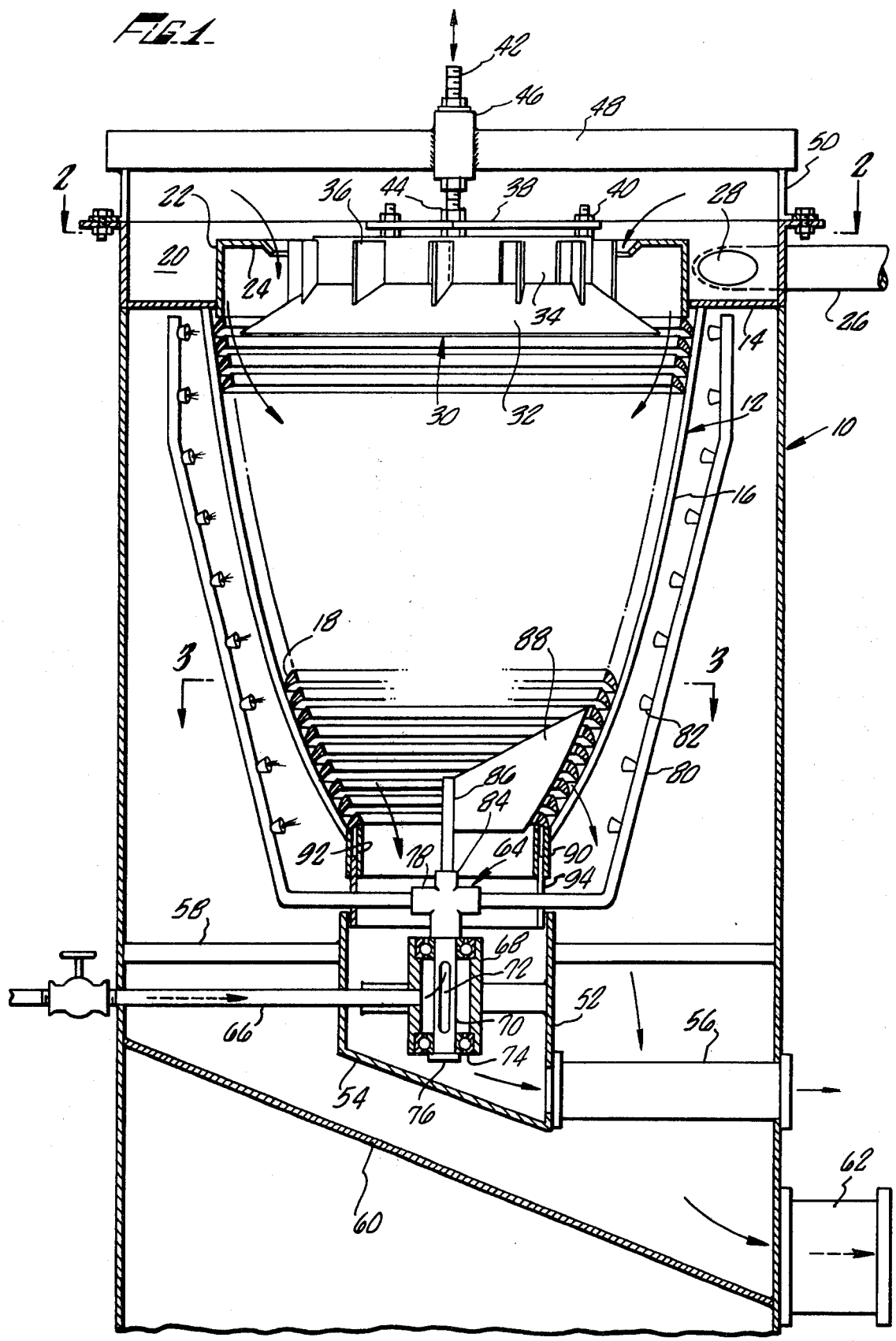
FIG. 1 is a cross-sectional elevation of the present invention.

Turning in detail to the drawings, and particularly FIG. 1, a screening apparatus of the present invention is illustrated. The screening apparatus includes a cylindrical support structure 10 which acts as a housing and frame for the apparatus. Within the support structure, a bowl-shaped screen assembly 12 is positioned such that the vertical centerline of the screen assembly is approximately centered in the cylindrical support structure 10. The screen assembly 12 is fixed to the cylindrical support structure by means of an annular plate 14.

The screen assembly 12 includes a series of ribs 16 which run longitudinally along the outer side of the assembly. Inwardly of the ribs 16, a screen element 18 is spirally wrapped to define a bowl-shaped screen. The bowl-shaped screen preferably conforms to a surface of revolution defined by rotating the curve of quickest descent, extending between the inlet and outlet, about an axis spaced from the outlet end of the curve by the radius of the outlet opening. The element 18 has a convex upper surface, a concave lower surface and a substantially flat inner surface as can best be seen in FIG. 4. The flat inner surface of the element forms, upon multiple winds of the element, a relatively smooth bowl-shaped screening surface as seen by the descending influent. The surface thus formed is interrupted by screen openings between the element winds to strip off layers of the passing influent. Each stripped layer of influent is then induced by means of the convex upper surface of the element 18 to flow down along the outside of the screen to the bottom of the assembly 12. This flow along the outer side of the screen has been found to create a vacuum in the spaces between the elements to induce further stripping of water from the influent. The use of spaced bars positioned transversely to an influent flow has been generally known as a static sieve and has been employed for some period of time. Reference is made to U.S. Pat. Nos. 2,872,041, and 2,916,142, for further insight into the theory of such screening structures.

At the upper end of the screen assembly 12, a first circular opening, centrally located in the assembly, is presented. At the lower end, a second, smaller opening is centrally provided. Influent is fed through the upper opening and concentrate is recovered through the lower opening. Effluent, passed through the screen, runs down the outside of the screen assembly 12.

Located at the upper end of the screening apparatus is an influent manifold, generally designated 20. The influent manifold 20 is defined by the outer wall of the cylindrical support structure 10, the annular plate 14 and a cylindrical inner wall 22. The inner cylindrical wall 22 includes a radially inwardly extending flange 24 having an inner truncated conical portion to allow the influent to smoothly flow downwardly toward the screen assembly 12. An inlet pipe 26 extends to an opening 28 through the outer wall of the cylindrical support structure 10 in a direction approximately tangential to the center of the circular trough formed by the outer wall of the cylindrical support structure 10, the cylindrical inner wall 22 and the annular plate 14. The orientation of the inlet pipe 26 induces a current in the influent to help prevent the separation of any of the solids and to induce a tangential velocity in the influent passing over the lip of flange 24.

Positioned within the upper opening of the screen assembly 12 is a distributor cone 30. The distributor cone 30 has a truncated conical member 32 extending downwardly and outwardly from a cylindrical member 34. The associated members 32 and 34 received influent from over the flange 24 and distribute that influent downwardly and outwardly toward the upper end of the screen assembly. Vertical vanes 36 extend outwardly from the members 32 and 34 as can best be seen in FIGS. 1 and 2. These vertical vanes 36 operate as a crude turbine as the influent, having a lateral velocity component, impinges onto the distribution cone. By means of the vertical vanes 36, rotational motion is developed in the distribution cone. This rotational motion helps to make uniform the flow of influent to the screen assembly 12.

Rotatably supporting the distributor cone 30 is a bracket 38 which extends outwardly in three directions to fasteners 40 located about the cylindrical member 34 as can best be seen in FIG. 2. At the center of the bracket 38, a threaded shaft 42 is held in place by locking nuts 44. The nuts 44 may be moved up and down relative to the shaft for adjustment of the distributor cone 30. The shaft 42 extends through a bearing 46 by which the distributor 30 is rotatably mounted. The shaft 42 may itself be selectively positionable in the bearing 46 to provide a means for adjustment of the vertical position of the distributor cone 30. The bearing 46 is fixed to a beam 48 which extends outwardly to be supported upon brackets 50 conventionally associated with the upper end of the cylindrical support structure 10.

The truncated conical member 32 of the distributor cone 30 extends outwardly and downwardly to a position near the upper and inner portion of the bowl-shaped screen assembly 12. Because of the bowl-shaped nature of the screen assembly 12, vertical movement of the distributor cone 30 will operate to increase or decrease the size of the annular inlet between the outer edge of the truncated conical member 32 and the inner surface of the screen assembly 12. In this way, the screening apparatus may be adjusted to accommodate different flow rates and influent properties. The adjustable nature of the inlet and the uniform distribution provided by the rotatable distribution cone 30 help provide efficient, trouble-free operation of the screening apparatus.

Below the screen assembly 12, a concentrate receiver 52 is positioned to collect the concentrate passing from the lower opening in the bowl-shaped screen assembly 12. The concentrate receiver 52 is nothing more than a cylindrical container, opened at the top, and having a sloping bottom 54 which allows concentrate to flow toward an outlet pipe 56. The concentrate receiver is supported on the cylindrical support structure 10 my means of support members 58. An effluent receiver is defined by the outer wall of the cylindrical support structure 10 and a sloping plate 60 which urges effluent toward drain 62.

Located centrally beneath the screen assembly 12 is a backspray manifold assembly generally designated 64. The backspray manifold assembly 64 includes an inlet pipe 66 which may be hooked to a tap for water. The inlet pipe 66 extends through the wall of the concentrate receiver 52 and into a bearing housing 68. A pipe 70 having longitudinal slits 72 through the wall thereof is rotatably mounted by bearings 74 in the bearing housing 68. A lower collar 76 on the pipe 70 prevent longitudinal movement upwardly from the bearing housing 68. Above the bearing housing 68, a tee 78 is associated with the pipe 70 such that backspray water may be fed through the pipe 70 and then through the tee 78.

Extending from each lateral port in the tee 78 are two backspray lines which extend generally upwardly about the outer side of the bowl-shaped screen assembly 12. These backspray lines 80 are opposed for balance. A plurality of nozzles 82 are strategically placed along the backspray lines 80 to impinge on the screen assembly 12. The rotatable mounting of the backspray manifold allows the nozzles 82 to cover the entire outside of the screen assembly 12. The nozzles are also positioned such that a tangential flow component is experienced to serve as a jet drive for inducing rotation of the backspray manifold. The orientation of the nozzles 82 for this purpose can be best seen in FIG. 3.

A tapped boss 84 extends upwardly from the tee 78 to receive the handle 86 of a hard rubber wiper 88. Because of the orientation of the nozzles 82, the wiper also rotates with the backspray manifold to urge concentrate from the lower inside portion of the screen assembly 12. Thus, a positive extraction of concentrate is accomplished without the requirement of additional labor. By means of the rotating backspray and wiper assembly, the screen assembly 12 is kept at maximum efficiency.

To prevent remixing of the concentrate and effluent, a simple labrynth seal is provided at the lower end of the screen assembly 12. The labrynth seal consists of two cylindrical members 90 and 92 which extend concentrically over a cylindrical seal 94 fixed about the backspray manifold. The cylindrical seal 94 is closely associated with the cylindrical wall of the concentrate receiver 52, again to prevent remixing of effluent with concentrate.

Thus, an improved static screening apparatus is provides which includes efficient distribution of influent and efficient continuous cleaning of solids from the screen assembly.

While embodiments and applications of this invention have been shown and described, it would be apparent to those skilled in the art that many more modifications are psosible without departing from the inventive concepts herein described. The invention, therefore, is not to be restricted except by the spirit of the appended claims.

What is claimed is:

1. A screening apparatus having a support structure, a stationary screen fixedly mounted in said support structure, said screen being bowl-shaped with a first opening centrally located at the upper end thereof and a second, smaller opening centrally located at the lower end thereof, an influent passage located near the top of said support structure, an effluent receiver about said screen and a concentrate receiver below said second opening; wherein the improvement comprises, in combination, an influent manifold having an annular channel, a tangential inlet for said influent passage and an inner wall defining one side of said annular channel and extending to an edge over which influent can flow towards said screen;

a distributor cone mounted to said support structure and positioned in said first opening to receive influent from said influent manifold and distribute the influent outwardly and downwardly to said screen, said distributor cone extending to near said screen forming an annular orifice therebetween; and means for rotatably mounting said cone to said support structure.

2. The screening apparatus of claim 1 wherein said distributor cone includes vanes thereon which are positioned such that influent from said influent manifold can impinge on said vanes to rotate said distributor cone.

3. The screening apparatus of claim 1 further including a backspray manifold rotatably mounted relative to said support structure and extending upwardly about said screen on the exterior thereof, nozzles on said backspray manifold directed to provide a tangential component of flow therefrom to induce rotation of said backspray manifold, and a wiper attached to said backspray manifold to rotate therewith, said wiper extending through said second opening to wipe the lower portion of said screen.

* * * * *